SEMI-CONDUCTOR DEVICES

Filed Oct. 20, 1961

United States Patent Office

3,143,444

Patented Aug. 4, 1964

3,143,444

SEMI-CONDUCTOR DEVICES

Ronald Charles Lowe, Sutton Coldfield, and Thomas Lawrence Hughes, Birmingham, England, assignors to Joseph Lucas (Industries) Limited, Birmingham, England Filed Oct. 20, 1961, Ser. No. 146,565
Claims priority, application Great Britain Nov. 9, 1960
1 Claim. (Cl. 148—188)

This invention relates to a process for manufacturing a semi-conductor device, the process being of the kind in which a slice of semi-conductive material of one polarity has a layer of the opposite polarity formed on at least one face thereof by diffusing a suitable impurity from a gaseous atmosphere into said one face.

According to the invention, in a process of the kind specified after the gaseous atmosphere is removed the slice is maintained at a temperature and for a period of time sufficient to allow further diffusion to take place so that the greatest concentration of the impurity occurs below the surface of said layer.

Figure 1:
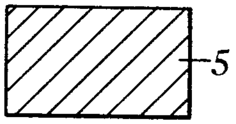
Figure 2:
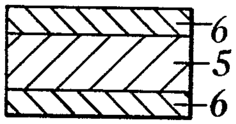
Figure 3:
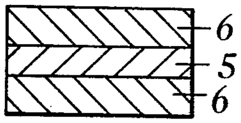
Figure 4:
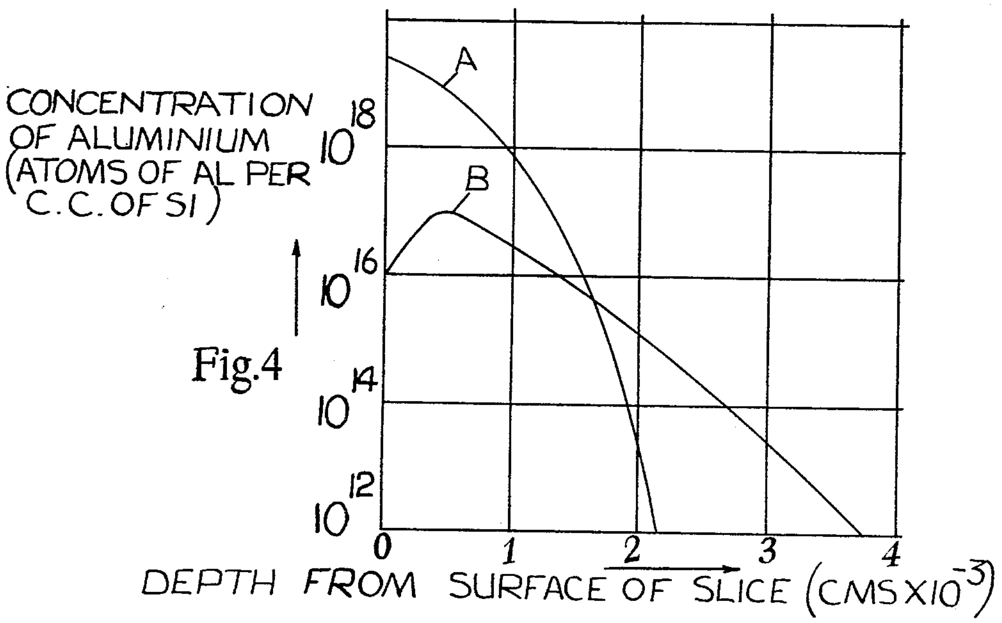

An example of the invention is illustrated in the accompanying drawings, in which FIGURES 1 to 3 respectively illustrate three stages of the process, and FIGURE 4 is a graph indicating the manner of variation of impurity with the depth of the slice.

Referring to the drawings, a slice 5 of silicon is suitably treated so that it is of n-polarity. The slice is placed in an atmosphere of gaseous aluminium at a temperature of 1200° C. for a length of time dependent on the required thickness of the layers of p-type impurity 6 to be diffused into opposite faces of the slice. The gaseous atmosphere is then removed, the temperature being maintained at 1200° C. or at some lower value in excess of 1000° C. The slice is now of the form shown in FIGURE 2 and the concentration of aluminium varies with the depth of the slice in the manner shown by the curve A in FIGURE 4.

It is found that on removal of the gaseous aluminium atmosphere diffusion continues into the slice from the outermost layers thereof, so that after a period of time the greatest concentration of aluminium occurs below the surface of each layer of impurity. This effect occurs when the slice is maintained in an atmosphere in which aluminium atmosphere is replaced by air. In one example, the diffusion is allowed to continue for 8 hours. The slice is now of the form shown in FIGURE 3, the concentration of aluminium varying with the depth of the slice in the manner shown by the curve B in FIGURE 4.

A slice formed by the process above described is found to have improved properties as compared with slices which are formed by a process in which the additional diffusion is not permitted to occur, so that the greatest concentration of aluminium is at the surface of the layer. For example, in one instance where such a slice was incorporated in a transistor the gain of the transistor was increased from 1 to 60, and in addition the breakdown voltage of the transistor was increased.

Having thus described our invention what we claim as new and desire to secure by Letters Patent is:

A process for manufacturing a P-N-P semiconductor slice comprising: placing a slice of N-type silicon in an atmosphere of gaseous aluminum, at an elevated temperature, leaving said slice in said atmosphere at an elevated temperature for a time necessary to diffuse aluminum into said slice and to produce P-type layers on opposite faces of said slice, removing the atmosphere of gaseous aluminum, and then maintaining said slice in air at an elevated temperature for a period of time necessary to diffuse aluminum into the slice to thereby change the concentration profile of said aluminum such that the greatest concentration of aluminum occurs below the surface of the slice.

References Cited in the file of this patent

UNITED STATES PATENTS

| | | |
|---|---|---|
| 2,784,121 | Fuller | Mar. 5, 1957 |
| 2,810,870 | Hunter et al. | Oct. 22, 1957 |
| 2,868,678 | Shockley | Jan. 13, 1959 |
| 3,028,655 | Dacey et al. | Apr. 10, 1962 |